United States Patent [19]
Brazell et al.

[11] Patent Number: 5,647,258
[45] Date of Patent: Jul. 15, 1997

[54] FENCE ADJUSTMENT MECHANISM

[75] Inventors: Kenneth M. Brazell, Phoenix; Robert G. Everts, Chandler, both of Ariz.

[73] Assignee: Ryobi Outdoor Products, Chandler, Ariz.

[21] Appl. No.: 219,775

[22] Filed: Mar. 30, 1994

[51] Int. Cl.$^6$ ................................................. B23Q 3/02
[52] U.S. Cl. ..................... 83/438; 83/468; 83/522.19; 144/286.1
[58] Field of Search ...................... 83/467.1, 468, 83/468.6, 468.7, 522.19, 522.24, 522.25, 438; 144/286 A, 286 R; 269/303, 304, 315

[56] References Cited

U.S. PATENT DOCUMENTS

| | | | |
|---|---|---|---|
| 2,075,282 | 3/1937 | Hedgpeth | 83/438 |
| 2,166,703 | 7/1939 | Boice | 83/438 |
| 2,273,715 | 2/1942 | Lonskey et al. | 83/438 |
| 2,325,082 | 7/1943 | Tautz | 83/438 |
| 2,562,246 | 7/1951 | Van Dam et al. | 83/438 |
| 2,799,305 | 7/1957 | Groehn . | |
| 2,806,493 | 9/1957 | Gaskell | 83/438 |
| 2,808,084 | 10/1957 | Eschenburg et al. | 83/438 |
| 2,966,179 | 12/1960 | Gaskell | 83/438 |
| 3,011,531 | 12/1961 | Gaskell | 83/438 |
| 4,114,665 | 9/1978 | Decker . | |
| 4,256,000 | 3/1981 | Seidel . | |
| 4,696,213 | 9/1987 | Conneally | 83/468 |
| 4,745,834 | 5/1988 | Neumann . | |
| 5,024,257 | 6/1991 | Lloyd . | |
| 5,063,983 | 11/1991 | Barry . | |
| 5,116,249 | 5/1992 | Shiotani et al. . | |
| 5,181,446 | 1/1993 | Theising | 83/438 |
| 5,233,920 | 8/1993 | Shinmoto et al. . | |
| 5,299,609 | 4/1994 | Wedler | 144/1 F |

OTHER PUBLICATIONS

Owner's Operating Manual for 10" Table Saw/BT-3000; Ryobi America Corp.; Jun. 1991.
Micro Fence Brochure, Micro-Fence, North Hollywood, CA, undated.

*Primary Examiner*—Rinaldi I. Rada
*Assistant Examiner*—Elizabeth Stanley
*Attorney, Agent, or Firm*—Brooks & Kushman P.C.

[57] ABSTRACT

An adjustment mechanism is provided for positioning a fence assembly along a guide rail of a bench top woodworking tool. The device includes a body member having a guide way portion which is linearly slidable along the guide rail and lockable at various positions. The barrel's body is provided with an elongated axial bore parallel to the guide rail. An elongated barrel extends through the bore and the body of the barrel is relatively rotatable thereto. An attachment member connects the elongated barrel to the fence assembly so that relative rotation of the elongated barrel and the body member causes the attachment member and fence assembly to move linearly relative to the body. The body member is provided with a locking mechanism so that the body member can be secured to the guide rail at various positions to facilitate precise adjustments of the fence relative to a woodworking tool cutter.

11 Claims, 2 Drawing Sheets

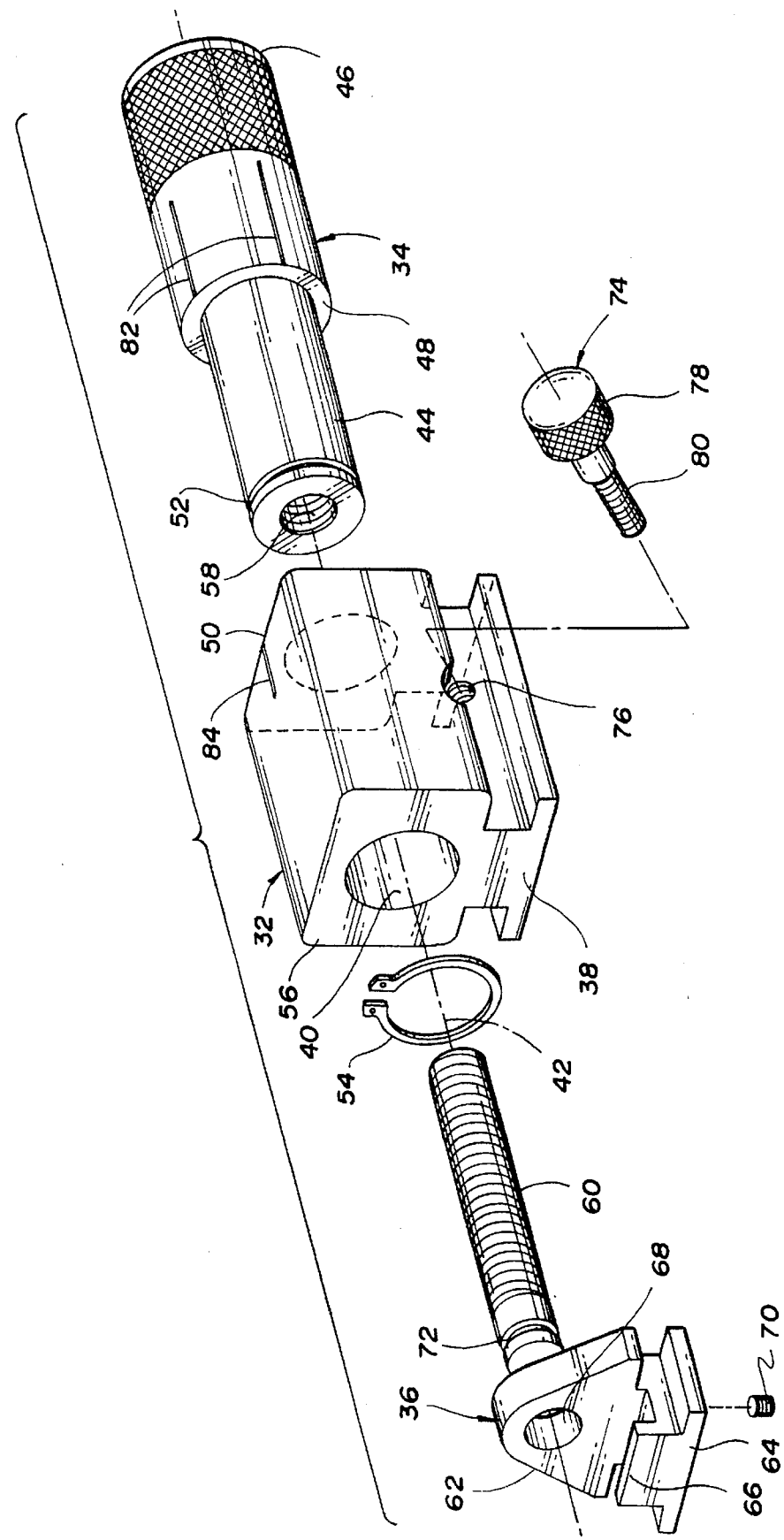

FENCE ADJUSTMENT MECHANISM

TECHNICAL FIELD

This invention relates to woodworking tool fence adjustment mechanisms and more particularly to adjustment mechanisms for making precise minute adjustments of a table saw fence.

BACKGROUND ART

Tablesaws, shapers and router tables are frequently provided with a fence for guiding a workpiece relative to a rotary cutting tool. For example, in a tablesaw, the rotary blade will project upward through a slot in the surface of the table, a rip fence will be oriented parallel to the blade and shiftable toward and away therefrom. The rip fence typically spans between a front and a rear guide rail which runs along the front and rear marginal edges of the table, generally perpendicular to the plane of the saw blade when in the vertical orientation. In order to accurately locate the rip fence relative to the blade, a scale is typically provided on the guide rail and a corresponding pointer is provided on the fence. In order to increase positioning accuracy when moving the fence, the pointer on the fence will often be provided with a cylindrical lens to magnify the scale indicia.

If it is desired to move the fence ⅛ of an inch toward the blade, the fence is unlocked by releasing a fence locking handle. The user will then tap the fence or the fence front block until the scale pointer indicates an ⅛ of an inch movement and the fence is then relocked in place. It is difficult, however, to make accurate adjustments much less than ¹⁄₁₆ of an inch due to the natural limitations of the scale and pointer measurement system and the fact that the fence will sometimes move slightly when the locking handle is secured.

A typical tablesaw employing a conventional fence is shown in U.S. Pat. No. 5,116,249. A tablesaw which the preferred embodiment of the present invention was specifically adapted to cooperate with is illustrated in Ryobi Owner's Operating Manual 10" Tablesaw/BT3000, circa 1991, which is incorporated by reference herein. Specifically, on pages 32 and 36 of the Owner's manual, the general construction of a saw table and front and rear rails is shown as well as the construction of a typical rip fence assembly.

DISCLOSURE OF THE INVENTION

It is an object of the present invention to provide a mechanism for precisely adjusting the position of a fence of a woodworking tool such as a tablesaw or the like where the fence needs to be precisely adjusted relative to a rotating cutter.

It is a further object of the present invention to provide an adjustment mechanism which can be easily installed on a tablesaw without the use of tools.

It is another object of the present invention to provide an adjustment mechanism for positioning a tablesaw fence which when unlocked will slide freely along the saw guide rail without effecting normal fence performance.

It is a further object of the present invention to provide a fence adjustment mechanism which is removably attachable to the saw guide rail and can retain the fence assembly yet enable the fence assembly to be readily removed from the tablesaw in a conventional manner.

An advantage of the present invention is its ability to provide an adjustment mechanism which is easy and inexpensive to manufacture, yet capable of providing very accurate fence adjustments.

These and other advantages and features that benefit the invention are more readily understood from a review of the attached drawings and the accompanying specification and claims.

Accordingly, a fence adjustment mechanism for a bench top woodworking tool such as a tablesaw or the like is provided to position the fence assembly along a guide rail at various positions relative to a rotary cutter. The adjustment mechanism is made up of a body having a guide way portion which slides along the length of the guide rail. The body has a bore formed therethrough which is aligned along an axis spaced from and parallel to the guide rail. An attachment member cooperates with the fence assembly in order to limit the movement thereof relative to the body member and the rotary cutter. An elongated barrel having a cylindrical section rotatably cooperates with the bore of the body member. The barrel is provided with a helical threaded region which extends about the axis. The threaded region cooperates with at least one of the body member and attachment member so that as the elongated barrel is rotated relative to the body, the attachment member is moved linearly along the guide rail. A locking mechanism is provided for releasably securing the body member to the guide rail at various positions.

In the preferred embodiment, the cylindrical section of the elongated barrel has a smooth surface for freely rotatingly cooperating with the corresponding smooth cylindrical bore in the body member. The barrel threaded region is formed in an axial hole extending into the barrel which cooperates with a threaded screw member projecting axially from the attachment member.

BRIEF DESCRIPTION OF THE DRAWINGS

FIG. 3 is an exploded perspective view of the fence adjustment mechanism.

BEST MODE FOR CARRYING OUT THE INVENTION

Figure 1:
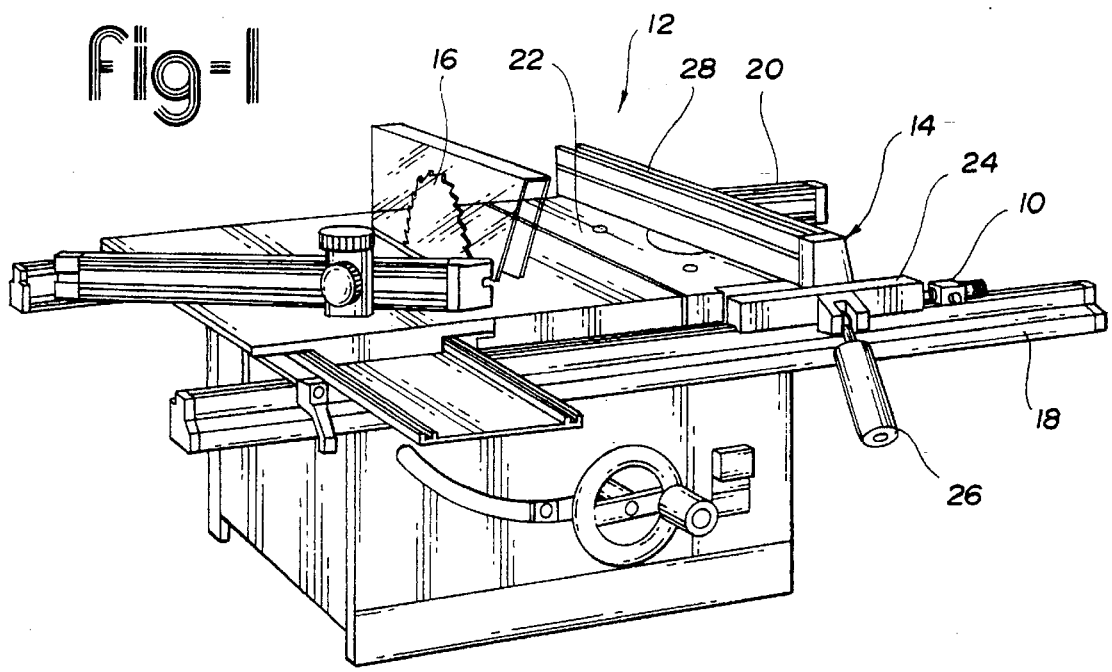
FIG. 1 is a perspective view of a tablesaw having attached thereto a fence adjustment mechanism of the present invention.
Figure 2:
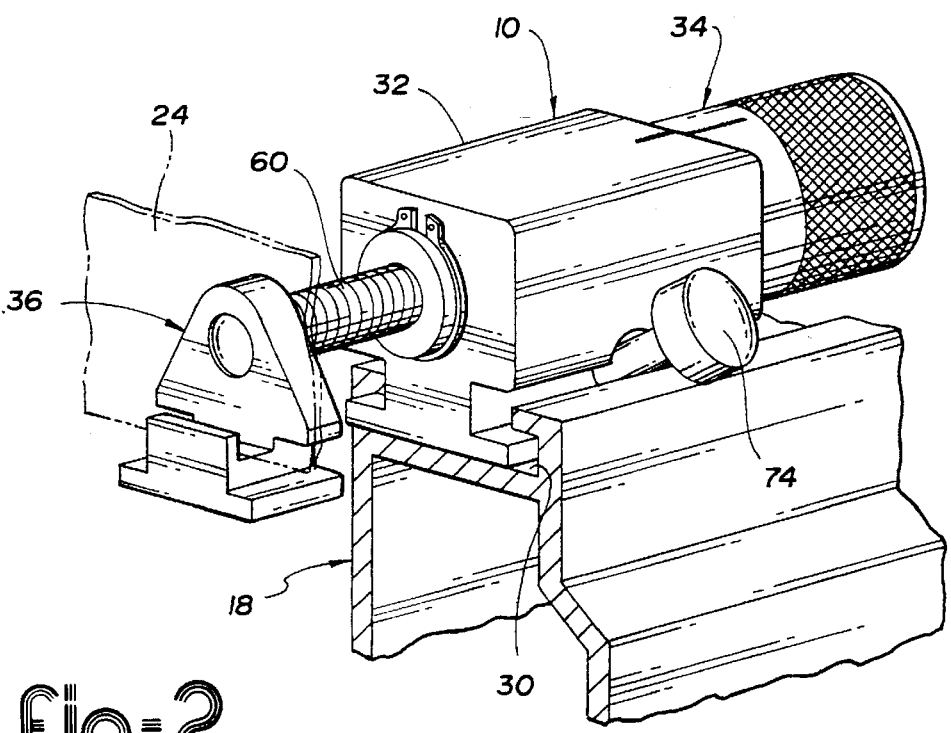
FIG. 2 is an enlarged perspective view of the fence adjustment mechanism cooperating with the tablesaw fence and front guide rail.

Referring to FIGS. 1–3, a fence adjustment mechanism 10 of the present invention is illustrated. The fence adjustment mechanism 10 is mounted on tablesaw 12 to position rip fence assembly 14 transversely relative to saw blade 16. Rip fence assembly 14 extends between front rail 18 and rear rail 20 spanning saw table 22. The rip fence assembly 14 includes a front block 24 having a locking handle 26 for releasably securing the rip fence assembly 14 to front and rear rails 18 and 20 respectively. The rip fence assembly 14 includes a fence rail 28 which is oriented parallel to and spaced from saw blade 16. Fence rail 28 is used to position a piece of wood or the like relative to the saw blade during a rip sawing operation.

In the preferred embodiment of the invention illustrated, front rail 18 is formed of an aluminum extrusion having a T-slot 30 formed in the front rail top surface. Fence adjustment mechanism 10 cooperates with T-slot 30 of the front rail 18 as illustrated in FIG. 2. The fence adjustment mechanism 10 is made up of three main components, a body member 32, a barrel 34 and an attachment member 36 for cooperation with the rip fence assembly 14. Body member 32 includes a T-slide 38 which forms a guide way portion for slidingly cooperating with T-slot 30 thereby retaining body member 32 to front rail 18 while permitting slidable movement therebetween along a linear path. Body member 32 is provided with an annular bore 40 which extends therethrough and is aligned along an axis 42 spaced from and parallel to the linear path defined by the front rail 18. The axis 42 of annular bore 40 is coaxially aligned with barrel 34 as illustrated in FIG. 3.

Barrel 34 is provided with a cylindrical section 44 sized to rotatably cooperate with annular bore 40 and an enlarged knob portion 46. The knob portion 46 is larger than the barrel section 44 defining a shoulder 48 which cooperates with first end face 50 of the body member 32. The cooperation of shoulder 48 and end face 50 limit the movement of barrel 34 relative to body member 32 in a first axial direction.

Preferably, cylindrical section 44 has a length sufficient to extend completely through annular bore 40 in body member 32. In a preferred embodiment, a snap ring groove 52 is formed in cylindrical barrel section 44 to facilitate the attachment of a retainer such as snap ring 54 prohibiting cylindrical section 44 from being withdrawn from annular bore 40 in the body. Snap ring 54 cooperates with a second end face 56 to enable the barrel 34 to rotate freely relative to body member 32. Accordingly, relative axial movement of barrel 34 along axis 42 is limited in a first axial direction by shoulder 48 and in a second axial direction by snap ring 54.

Barrel 34 is provided with a threaded central bore 58 which threadingly cooperates with lead screw 60. Lead screw 60 forms a part of attachment member 36. Attachment member 36 is made up of an attachment member body 62, lead screw 60, T-slide section 64, which slidingly cooperates with the T-slot 30 in front rail 18, and a hook portion 66. Attachment member body 62 and hook portion 66 are spaced relative to one another to securely retain a portion of the fence front block 24 therebetween as illustrated in FIG. 2. This attachment member design enables the user to remove the fence from the tablesaw without removing fence adjustment mechanism 10 from the front guide rail. Preferably, as illustrated in FIGS. 2 and 3, attachment member body 62, T-slide section 64 and hook section 66 are integrally formed as a single piece. Lead screw 60 is formed as a separate element and attached to the attachment member body 62 by inserting the lead screw 60 into bore 68 and securing set screw 70. Annular groove 72 is formed about lead screw 60 in order to securely retain the set screw 70.

In order to affix body member 32 to front rail 18 at the desired location, a locking mechanism is provided by lock screw 74 which threadingly cooperates with an inclined hole 76 extending through a portion of body member 32 in a region of the T-slide portion 38. Lock screw 74 includes a knurled knob 78 and a threaded screw portion 80. Tightening the lock screw 78 causes the free end of the threaded screw portion 80 of lock screw 74 to securely engage front rail 18, thereby prohibiting movement between the body and rail.

When using the fence adjustment mechanism, the device is first installed on the front guide rail, then rip fence assembly 14 is attached. With the fence adjustment mechanism lock screw loosened, the fence assembly is positioned to the desired location and secured in place. The user will then make a rip cut and check the size of the resulting board. If it is necessary to adjust the fence position to modify the board width, the direction and magnitude of the desired fence movement is determined, e.g. $\frac{1}{16}$" wider. Then the fence adjustment mechanism is pushed axially in the direction of the fence front block 24 to take up any slack in the adjustment mechanism. With the slack removed, lock screw 74 is then tightened to retain the body member 32 to the saw front rail 18. The fence locking handle 26 is then lifted freeing the fence assembly 14 relative to the front rail 18. With the fence released assembly 14, barrel 34 is rotated, which causes the lead screw 60 to advance or retract depending upon the selected direction of rotation. Once the lead screw has been rotated a sufficient amount to achieve the desired fence movement, the fence front block 24 is pushed toward the fence adjustment member 10 to remove the slack and the fence is then locked in place by lowering locking handle 26.

In order to precisely measure the amount of movement resulting from the rotation of the barrel 34, scale markings 82 are formed on the periphery of the barrel as illustrated, and a reference mark 84 is formed on body member 32. In that way, a lead screw pitch can be selected and the scale markings appropriately located around the periphery of barrel 34 so that a convenient reference is provided. For example, if lead screw 60 has a pitch of 16 threads per inch, one complete rotation of barrel 34 will cause the fence to move $\frac{1}{16}$". If scale markings are provided every $\frac{1}{4}$ of a revolution, each scale marking would equate to $\frac{1}{64}$" movement. Of course, alternative scales or screw pitches can be used as will be readily apparent to one of ordinary skill in the power tool art.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A fence adjustment mechanism for a bench top woodworking tool having a fence assembly releasably shiftable linearly along a guide rail at various positions relative to a cutting tool, said adjustment mechanism comprising:

a body member having a guide way portion for retaining the body member to the guide rail while permitting sliding movement along a linear path, said body member having formed therein a bore aligned along an axis spaced from and parallel to said linear path;

an attachment member cooperating with said fence assembly forming a stop to limit the movement of the fence assembly;

an elongated barrel aligned along said axis and having a cylindrical section rotatably cooperating with said bore of said body member, said barrel having a helical threaded region extending about said axis, said threaded region threadingly cooperating with at least one of said body member bore and attachment member to cause the attachment member to linearly move along the guide rail relative to the body member as a result of the rotation of the barrel relative to the body member; and a locking mechanism for releasably securing said body member to said guide rail at various positions.

2. The fence adjustment mechanism of claim 1 wherein said barrel is provided with a central internal bore in which said helical threaded region is formed, said attachment member including a threaded screw portion cooperating with said barrel helical threaded region.

3. The fence adjustment mechanism of claim 2 wherein said cylindrical section of the elongated barrel has an axial length which is enabling said elongated barrel to extend through said body member, and the elongated barrel is further provided with a shoulder slidingly cooperating with a first end face formed on said body member thereby prohibiting relative movement in a first axial direction, said attachment member further comprising a retainer mounted upon a portion of the elongated barrel and the retainer extends through the body member bore to engage a second end face formed on said body member to prohibit relative movement of the elongated barrel and the body member in an opposite second axial direction while facilitating free relative rotation in between.

4. The fence adjustment mechanism of claim 2 wherein said body member and said barrel are each provided with an alignable scale marking to enable the user of said woodworking tool to move the fence relative to the cutting tool a desired distance based upon said scale marking.

5. The fence adjustment mechanism of claim 1 wherein said attachment member is provided with a guide way slidingly cooperating with said guide rail.

6. The fence adjustment mechanism of claim 5 wherein said attachment member is removably attachable to said fence without the use of tools to limit the relative axial movement therebetween in both a first and second axial direction.

7. The fence adjustment mechanism of claim 1 wherein said locking mechanism comprises a locking screw threadingly cooperating with an aperture formed in said body member to cause the screw to shift into and out of engagement with said guide rail.

8. The fence adjustment mechanism of claim 1 wherein said guide way portion of the body member and the guide rail comprises a T-slot and a cooperating T-slide.

9. The fence adjustment mechanism of claim 8 wherein said guide rail comprises a T-slot and said guide way portion of the body member comprises a T-slide.

10. The fence adjustment mechanism of claim 8 wherein said attachment member is provided with a T-slide portion slidingly cooperating with said T-slot.

11. A fence adjustment mechanism for a tablesaw having a fence assembly releasably shiftable linearly along a guide rail at various positions relative to a saw blade, said adjustment mechanism comprising:

a body member having a guide way portion for retaining the body member to the guide rail while permitting sliding movement along a linear path, said body member having formed therein a bore aligned along an axis spaced from and parallel to said linear path;

an attachment member affixed to said fence assembly, said attachment member having an elongated screw portion aligned along said axis;

an elongated barrel aligned along said axis and having a cylindrical section for freely rotating relative to and cooperating with said bore of said body member, a knob region to be rotated by a user, a shoulder for abutting an end of said body member to limit relative rotation of the elongated barrel and the body member in a first axial direction, and a central axial hole formed therein having a helically threaded region cooperating with said screw portion of the attachment member to cause the attachment member to move relative to the body member as a result of the rotation of the barrel relative to the body member;

a retainer affixed to said elongated barrel and abutting said body member for limiting the relative axial movement therebetween in a second axial direction; and a locking mechanism for releasably securing said body member to said guide rail at the various positions.

* * * * *